… …

United States Patent [19]

Suzuka et al.

[11] Patent Number: 5,768,439

[45] Date of Patent: Jun. 16, 1998

[54] IMAGE COMPOUNDING METHOD AND DEVICE FOR CONNECTING A PLURALITY OF ADJACENT IMAGES ON A MAP WITHOUT PERFORMING POSITIONAL DISPLACEMENT AT THEIR CONNECTIONS BOUNDARIES

[75] Inventors: Toyoaki Suzuka; Kanji Yokokawa, both of Yokohama; Naruto Takasaki, Kawasaki, all of Japan

[73] Assignee: Hitachi Software Engineering Co., Ltd., Kanagawa-ken, Japan

[21] Appl. No.: 408,072

[22] Filed: Mar. 22, 1995

[30] Foreign Application Priority Data

Mar. 23, 1994 [JP] Japan .................................. 6-051488

[51] Int. Cl.$^6$ ................ G06K 9/40; G06K 9/32; H04N 9/64; H04N 1/36
[52] U.S. Cl. ................ 382/254; 382/284; 382/293; 348/699; 358/416
[58] Field of Search ................ 382/254, 293, 382/294, 284; 358/416; 348/699

[56] References Cited

U.S. PATENT DOCUMENTS

| 4,644,582 | 2/1987 | Morishita et al. | 382/294 |
| 4,989,087 | 1/1991 | Pele et al. | 358/416 |
| 5,222,158 | 6/1993 | Takasaki et al. | 382/284 |
| 5,369,449 | 11/1994 | Yukitake et al. | 348/699 |

FOREIGN PATENT DOCUMENTS

| 559294 | 9/1993 | European Pat. Off. | |
| 655712 | 5/1995 | European Pat. Off. | |
| 60-175182 | 9/1985 | Japan | G06F 15/62 |
| 63-206874 | 8/1988 | Japan | G06F 15/66 |
| 7-11826 | 2/1995 | Japan | G06F 15/62 |

OTHER PUBLICATIONS

S. Guan et al, "Design for a 3D Deformable Brain Atlas", Computer–Based Medical Systems, May 12, 1991, pp. 113–120.

H. Yamada, "Map Matching—Elastic Shape Matching by Multiangled Parallelism", Systems and Computers in Japan, vol. 22, No. 6, 1991, pp. 55–56.

H. Hanaizumi et al, "An Automatic Registration Method for Remotely Sensed Multispectral Images by Using Spatial Correlation Between Local Triangles", IGARSS, 1989, vol. 3, pp. 1287–1290.

*Primary Examiner*—Andrew W. Johns
*Assistant Examiner*—Monica S. Davis
*Attorney, Agent, or Firm*—Fay, Sharpe, Beall, Fagan, Minnich & McKee

[57] ABSTRACT

Images on a plurality of adjacent maps are accurately connected without performing positional displacement at their connecting boundaries, thereby obtaining a single seamless image. A plurality of corresponding points to be connected are specified on adjacent images. The amount of movement for each picture element on the image is calculated in order to make the specified corresponding points coincide. All of the picture elements in the image which are to coincide are moved according to the results of the calculations.

2 Claims, 10 Drawing Sheets

FIG. 6

| COMPENSATED PICTURE ELEMENT | o | p | q | r | s | t | u | v | w | j | k | l | m | n |
|---|---|---|---|---|---|---|---|---|---|---|---|---|---|---|
| PRE-COMPENSATING PICTURE ELEMENT | a | b | c | d | e | f | g | h | i | j | j | k | l | m | n |

F I G. 8
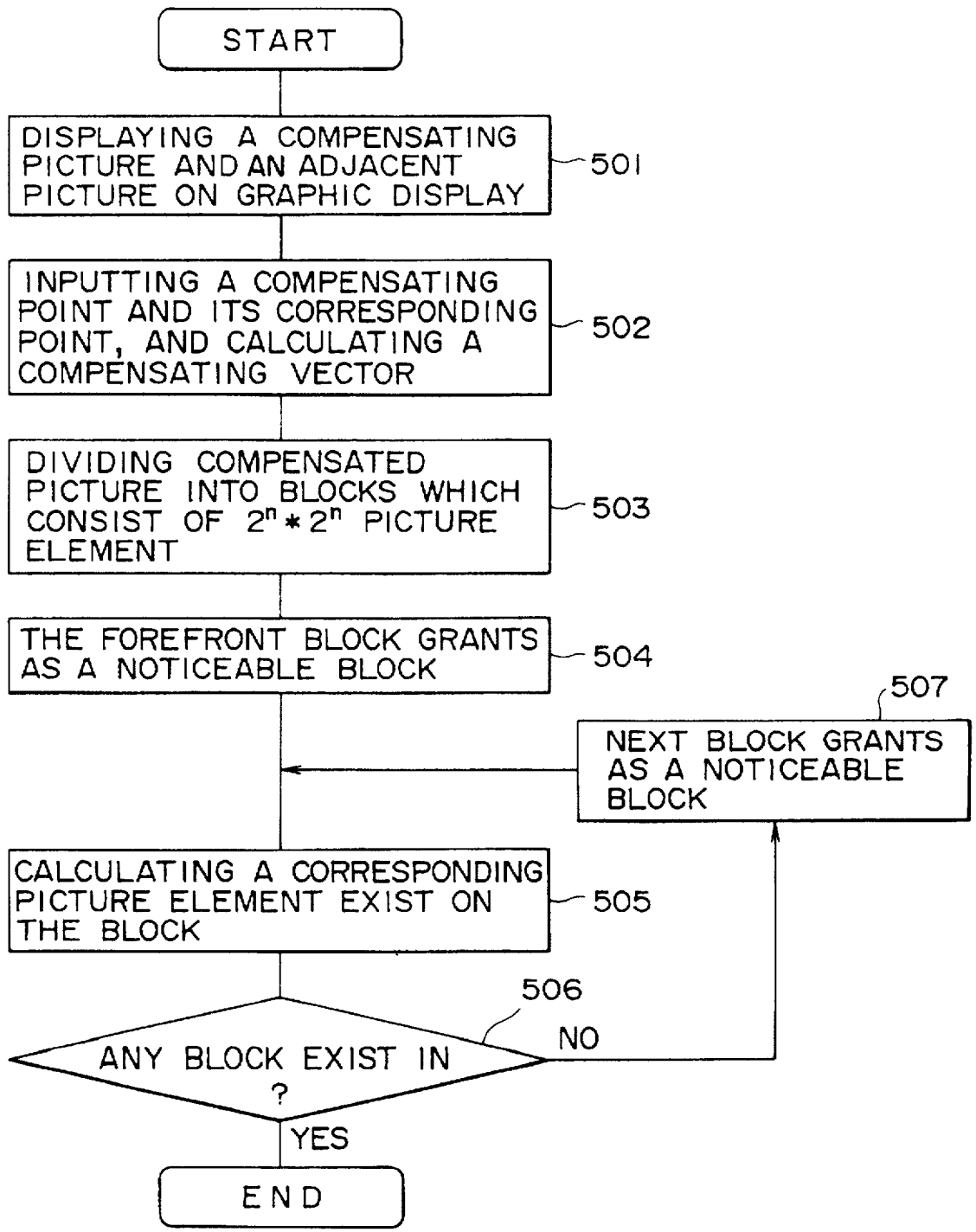

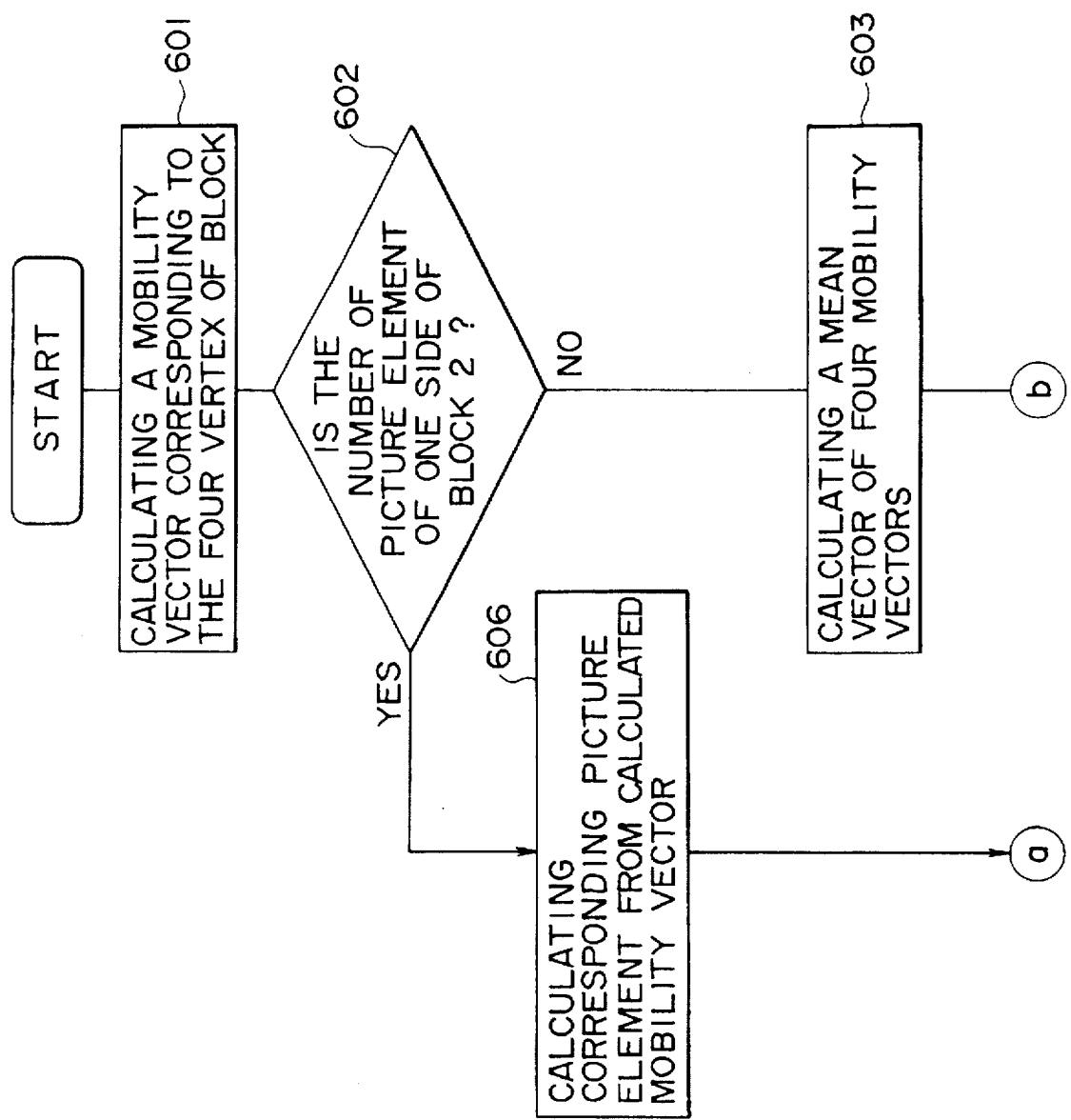

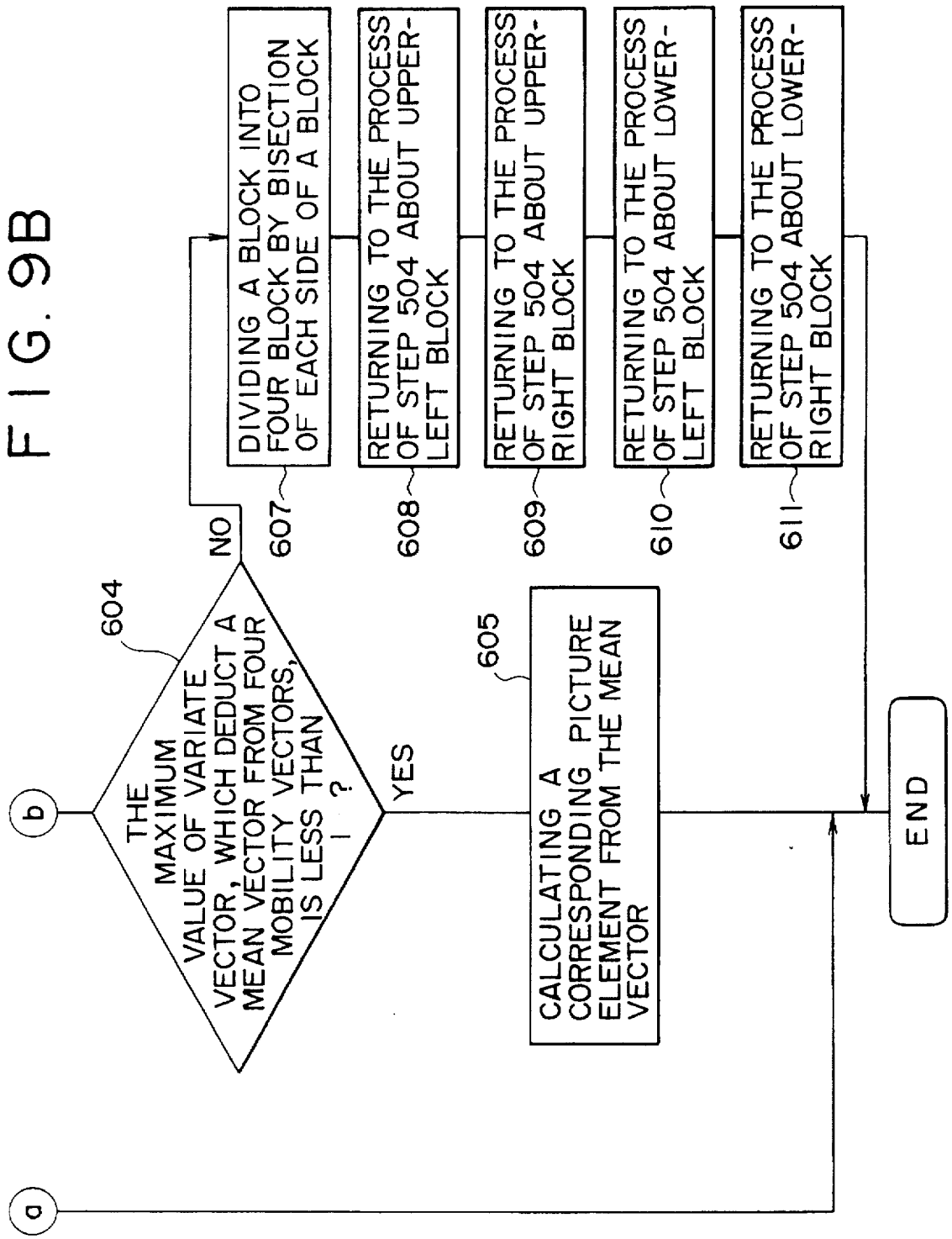

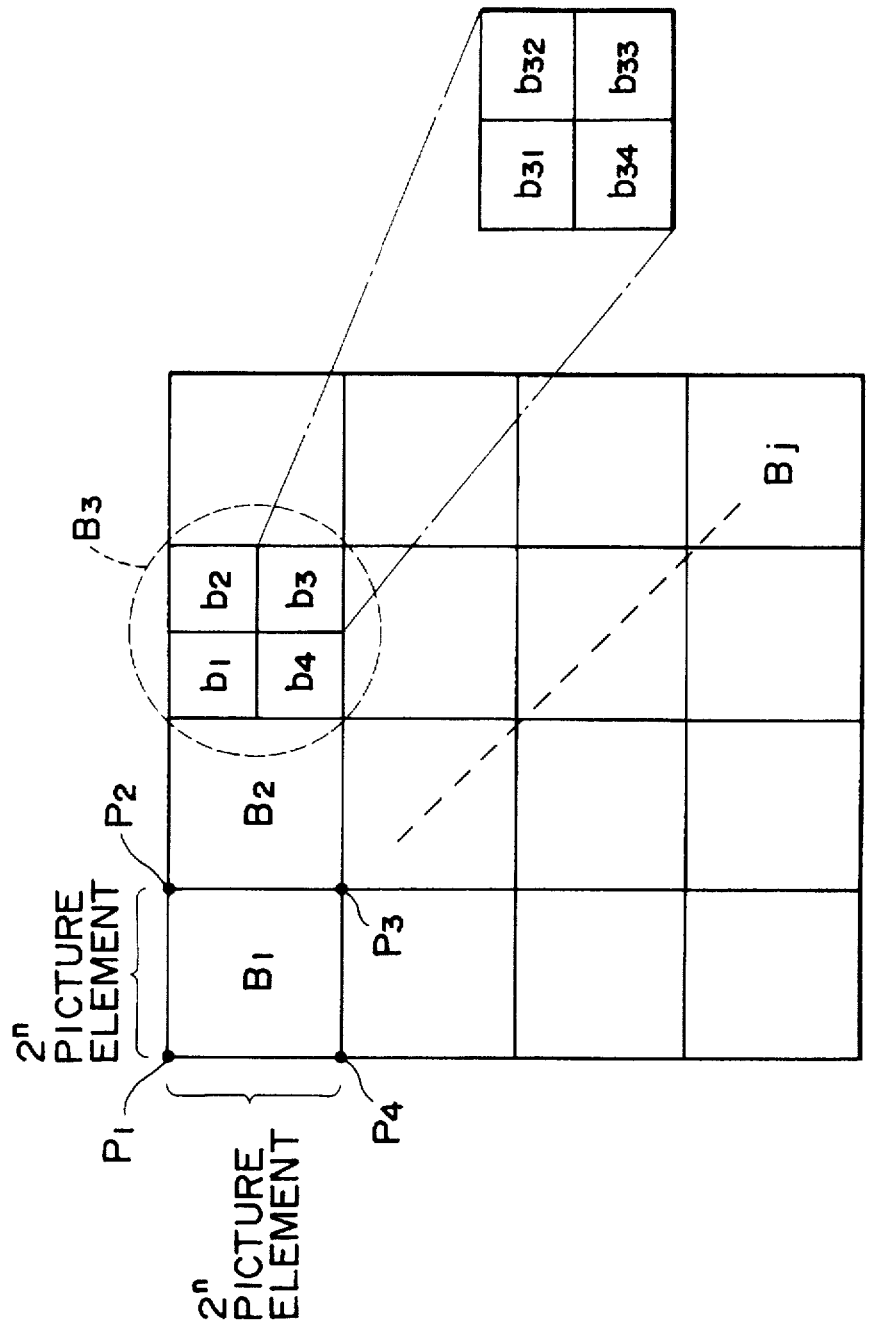

IMAGE COMPOUNDING METHOD AND DEVICE FOR CONNECTING A PLURALITY OF ADJACENT IMAGES ON A MAP WITHOUT PERFORMING POSITIONAL DISPLACEMENT AT THEIR CONNECTIONS BOUNDARIES

BACKGROUND OF THE INVENTION

The present invention relates to an image compounding method and device for compounding a plurality of images on a computer, and handling and displaying them as one continuous image.

Techniques used in the past for compounding a plurality of images, in particular of maps, include those targeted at maps constructed from vector data, and those which perform compensation based on lines of longitude and lines of latitude, based on raster data maps. Techniques for compounding maps constructed from vector data include, for example, the boundary vector data connection processing system disclosed in Japanese Patent Unexmained Publication No. 63-206,874. Further, those which perform compensation based on lines of longitude and lines of latitude include the map compounding device disclosed in Japanese Patent Unexamined Publication No. 60-175,182.

However, there is the problem that techniques which use vector data cannot be applied to map data in a raster data form which has been read from an image scanner.

Further, with compensation using lines of longitude and lines of latitude from raster data, lines of longitude (lines of latitude) are made to coincide, and the same compensation coefficients are used for the data between the lines of longitude (lines of latitude) as for the actual lines of longitude (lines of latitude). The problem thus arises that the same compensation is performed even on a plurality of different erroneous targets, and it is not possible to perform accurate compensation.

SUMMARY OF THE INVENTION

The present invention is intended to solve the above-mentioned problems, and it aims to provide an image compounding method and device with which it is possible to connect a plurality of adjacent images on a map accurately without performing positional displacement at their connection boundaries, and with which it is possible to obtain a single seamless image.

Another aim of the present invention is to provide an image compounding method and device with which it is possible to obtain a seamless image at high speed.

In order to achieve the aims such as those outlined above, the feature of the present invention resides in that an arbitrary number of corresponding points which are to be connected are specified on adjacent images, the amounts through which the picture elements in the image are to be moved in order to make the specified corresponding points coincide are calculated, and all of the picture elements in the coinciding image are moved according to the result of the calculations.

Further, in order to obtain the moved positions of the picture elements, the image which is to be subjected to compensation is divided into a plurality of square blocks, and when the difference between the mobility vectors of the vertices of each block and the mean vector is small, the picture elements within the block are batch-processed according to the mean vector.

With regard to positional displacement of objects which appear on the boundary of two maps, when points on one map on which compensation is to be performed are taken as compensation origin points, and points on the other map are taken as compensation destination points, compensating vectors which make the compensation origin points coincide with the compensation destination points are found, and picture elements on the map which is to be subjected to compensation should be displaced by the compensating vectors.

However, if displacement is performed using the same rate irrespective of the distance from the compensation destination point, then displacement of picture elements in positions separated from the boundary of the two maps will be too large, and this will result in unnatural compensation.

Arrangements are thus made such that the above mentioned compensating vectors are multiplied by coefficients whereby the amounts of compensation for picture elements which are close to the compensation destination point is large, and the amount of compensation decreases with distance from the compensation destination point, and displacement is performed by the resulting vector.

Thus in the present invention the positions of picture elements in the pre-compensation map image which correspond to picture elements in the post-compensation map image are found by multiplying the compensating vectors by coefficients which are inversely proportional to the distance from the compensation destination points to the picture elements on the post-compensating map image, and whose sum is "1", and the values of the resulting picture elements positions are set as the values of the picture elements corresponding to the post-compensation map image.

It is thus possible to connect the images on a plurality of adjacent maps accurately without performing position displacement at their connection boundaries, and to obtain a single seamless image.

Further, the image which is to be subjected to compensation is divided into a plurality of square blocks, and when the differences between the mobility vectors of the vertices of each block and the mean vector is small, the picture elements within the block are batch-processed according to the mean vector, and the number of cases in which batch-processing in performed according to the mean vector increases as the distance between the block and the seam of the images increases, and it is therefore possible to obtain a single seamless image at a speed which is extremely high in comparison with cases in which compensation is performed in single picture element units.

BRIEF DESCRIPTION OF THE DRAWINGS

FIG. 6 is an explanatory diagram showing the relationship between the positions of the post-compensation picture and the pre-compensation picture in FIG. 5.

FIG. 8 is a flowchart showing the processing sequence used in order to increase the speed of image compounding.

FIGS. 9A and 9B are flowcharts showing the details of step 505 in FIG. 8.

FIG. 10 is an explanatory diagram showing an example of the method of dividing an image.

DESCRIPTION OF THE PREFERRED EMBODIMENTS

Figure 1:
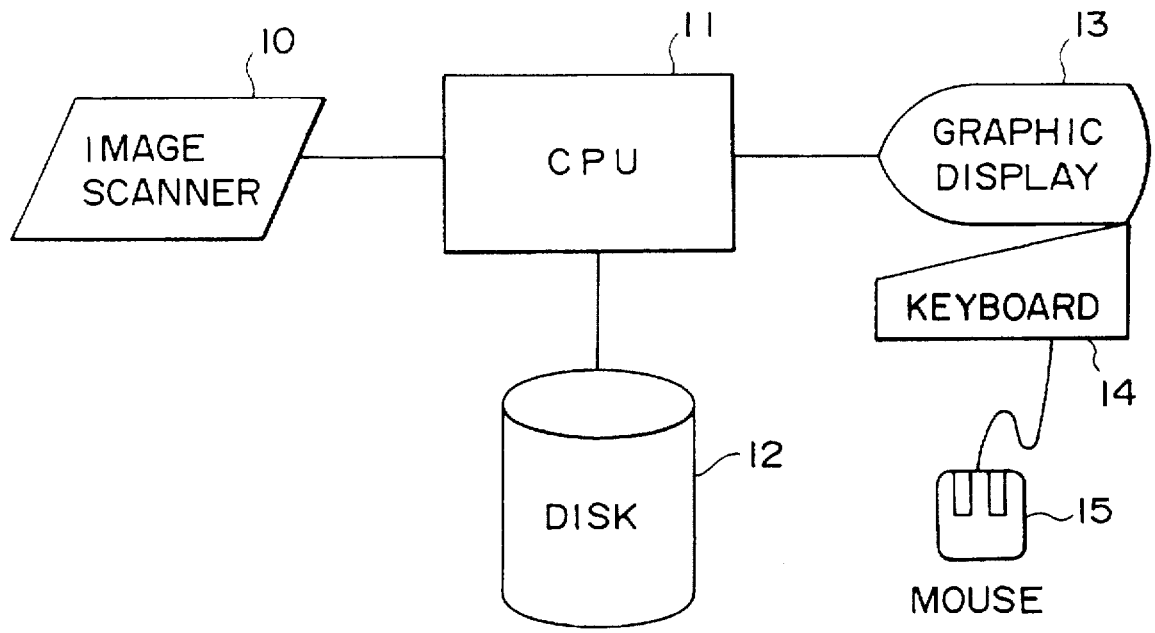
FIG. 1 is a block schematic diagram showing an embodiment of a device which implements the image compounding method according to the present invention.

FIG. 1 is a block schematic diagram of a device which implements the image compounding method according to the present invention.

The device in the present embodiment consists of an image scanner 10 which is an image input means for reading in images (pictures), a central processing unit 11 which performs the image compounding, a disk 12 which is an external storage unit which stores maps, a graphic display 13 for displaying maps, a keyboard 14 and a mouse 15 which are a position specification means for specifying target points for compensation. The disk 12 may be a hard disk or an optomagnetic disk.

Figure 2:
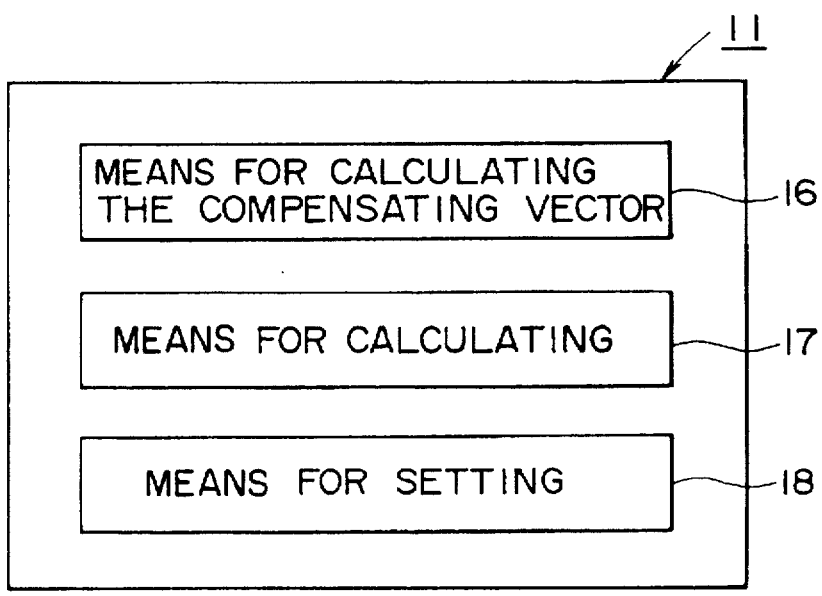
FIG. 2 is a detailed schematic diagram of the central processing unit in FIG. 1.

FIG. 2 is a diagram showing the details of the central processing unit 11.

The central processing unit 11 consists of a means for calculating the compensating vector (compensating vector calculating means) 16 which sets points on the picture which is to be subjected to compensation as compensation origin points, and points on the other image as compensation destination points, and which finds the compensating vector which make the compensation origin points coincide with the compensation destination points; a means for calculating (calculating means) 17 which finds the positions of picture elements in the pre-compensation picture (picture to be compensated) corresponding to the picture elements in the post-compensation picture (compensated picture) by multiplying the above mentioned compensating vectors by coefficients which are inversely proportional to the distance from the compensation origin points to the picture elements on the post-compensation picture, and the sum of which is "1"; and a means for setting (picture element value setting means) 18 which sets the values of the positions of picture elements founds by the calculating means 17 to the values of picture elements corresponding to the post-compensation picture.

Figure 3:
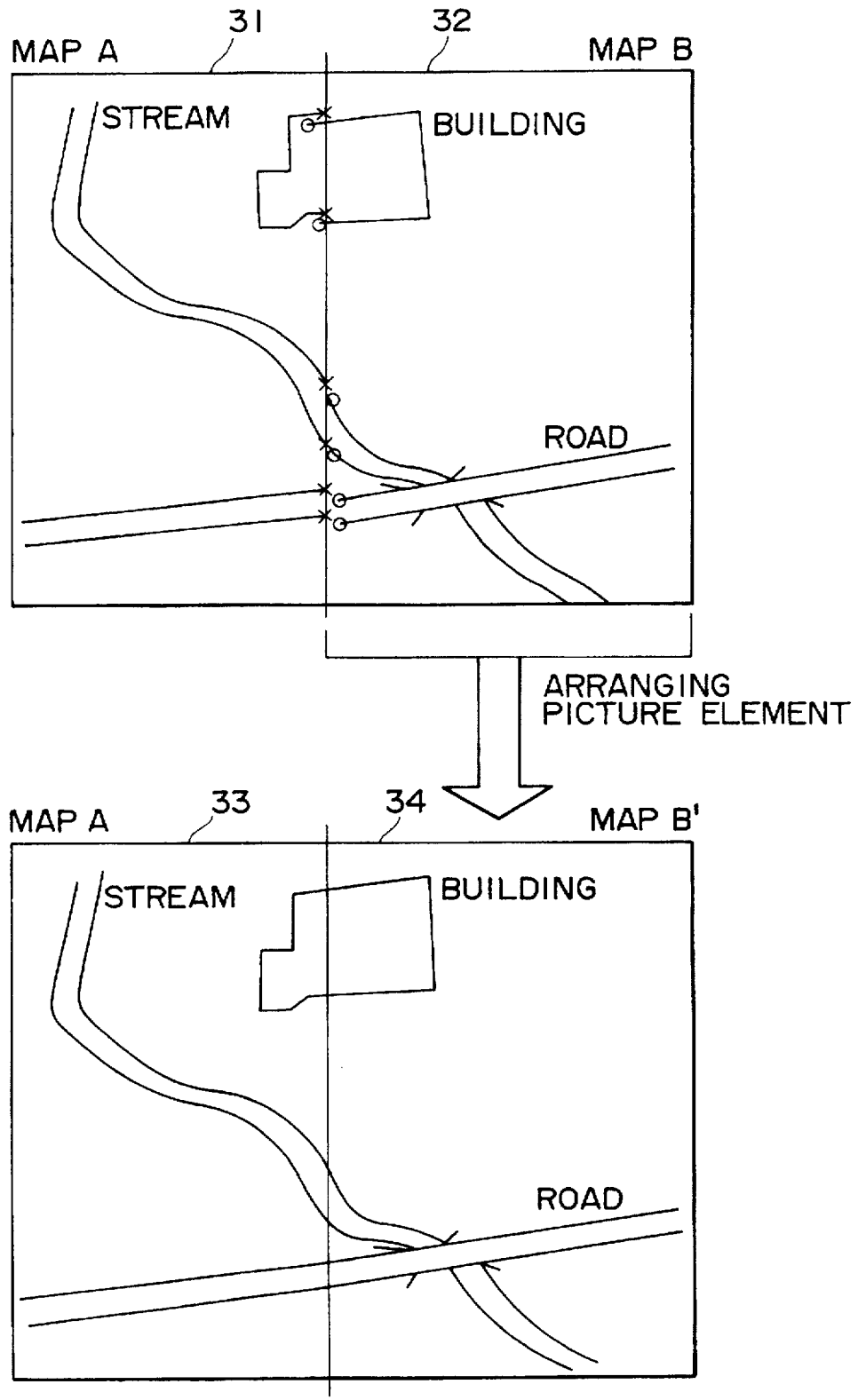
FIG. 3 is an explanatory diagram showing an example of images before compounding and the image after compounding.

FIG. 3 is an explanatory diagram of an image display showing the results of actual processing using the process of the present invention.

Map A 31 and map B 32 show distorted pre-compensation pictures which have been read in using an image scanner. Map A 33 and map B' 34 indicate pictures in which the distortion has been compensated.

Compounding of the images is performed by compensating one of the adjacent images.

When actually compensating a map, compensation is performed on the boundaries between the map and the adjacent four maps, but in order to simplify the explanation, in the present embodiment a description will be given of the method in a case in which two maps are connected at one boundary.

Here, points on the original image which are specified for compensation are called compensation origin points, their destinations are called compensation destination points, and the vectors from the compensation origin points to the compensating destination points are called compensating vectors.

An embodiment of the present invention will now be described in detail with reference to FIG. 4.

Firstly, two maps (map A 31 and map B 32) which have been input from the image scanner 10 are displayed on the graphic display 13 as shown in the upper figure of FIG. 3 (step 401).

In the present embodiment the map B 32 is taken as the object of the compensation. The result of the compensation is as shown in the bottom figure of FIG. 3.

End points (o symbol) which are the object of the compensation (compensation origin points), and compensation destination points (x symbol) are then specified using the mouse 15. The compensating vectors which make the compensation origin points coincide with the compensation destination points are then found using the coordinate values of the compensation origin points and compensation destination points (step 402).

The foremost picture element of the post-compensation picture is then taken as a noticeable picture element (picture element under consideration) (step 403).

The sum S of the reciprocals of the distances between the noticeable picture element and all of the compensation destination points are then found (step 404).

The total sum is then found of each compensating vector multiplied by the reciprocal of the product of S and the distance from the noticeable picture element to the compensation destination point (step 405). The picture element on the original picture corresponding to the noticeable picture element is then found using the vector obtained in step 405 (step 406).

It is determined (in step 407) whether or not the noticeable picture element is the last picture element, and if it is not the last picture element then the next picture element for consideration is specified (step 408), and the process from step 404 to step 406 is repeated. If in step 407 the noticeable picture element is the final picture element then the process ends.

For the whole process, the calculations for one picture element should be repeated for all of the picture elements.

A description will now be given of the actual method for finding one picture element in the map B 32 corresponding to a picture element in the map B' 34 using the process described in the flowchart in FIG. 4.

Here, vector references are indicated by the symbol "$\delta$", and if n compensating vectors are specified then the compensation origin points are indicated by $\delta Pi$, the compensation destination points are indicated by $\delta P'i$ (where i=1, 2, ... n), a picture element on the map B 32 is indicated by $\delta x$ and a picture element on the map B'34 is indicated by $\delta x'$.

The strategy involves considering the vector $\delta x - \delta x'$ which indicates the movement of the picture element, and at this time the following points are obeyed.

(1) $\delta x - \delta x'$ is the sum of the products of each compensating vector and certain coefficients.

For example, $\delta x - \delta x' = \alpha(\delta P1 - \delta P'1) + \beta(\delta P2 + \delta P'2)$ (2) The coefficients are inversely proportional to the distance of $\delta x'$ from $\delta P'$, such that the effect of a given compensating vector is large in the vicinity of the compensation destination point and decreases with distance therefrom. For example, if the distances are 3 and 5, then $\alpha = \frac{1}{3}$ and $\beta = \frac{1}{5}$.

(3) It should be noted that if the coefficients are used without further modification, discontinuous compensation will be applied in the vicinity of the compensation destination points, and therefore the coefficients are normalized such that their sum is "1". In other words, all of the coefficients are divided by the sum of the coefficients.

Recalculating the example coefficients gives $\alpha = (\frac{1}{3})/(\frac{1}{3}+\frac{1}{3})$, $\beta = (\frac{1}{3})/(\frac{1}{3}+\frac{1}{3})$.

A generalized formula for the above strategy is shown below.

Firstly, the sum S of the reciprocals of the distances between the noticeable picture element and all of the compensation destination points is found (step 404).

$$S = \sum_{i=1}^{n} \frac{1}{|\delta P_i - \delta x'|} \quad (1)$$

The coordinates x on the map B 32 corresponding to $\delta x'$ in the map B'34 are then found using S (steps 405 and 406).

$$\delta x = \delta x' + \sum_{k=1}^{n} \frac{1}{S|\delta P_k - \delta x'|} (\delta P_k - \delta P_k') \quad (2)$$

The value of the picture element with the coordinates x on the map B 32 should be taken to be the value of the picture element with the coordinates x' on the map B'34.

According to the present embodiment as mentioned above, a plurality of groups of points which are to be connected are specified on adjacent maps which have been read in by means of an image scanner 10. Then, points on the map which are to be subjected to compensation are taken as compensation origin points, and points on the other map are taken as compensation destination points. Compensating vectors which make the compensation origin points coincide with the compensation destination points are found. The positions of picture elements on the pre-compensation picture corresponding to the picture elements on the post-compensation picture are found by multiplying the abovementioned compensating vectors by coefficients which are inversely proportional to the distance from the compensation destination points to the picture elements on the post-compensation picture, and the sum of which is "1". The values of the resulting picture element positions are set as the values of the picture elements corresponding to the post-compensation picture, and it is therefore possible to connect pictures on a plurality of adjacent maps accurately without performing positional displacement at their connection boundaries, and it is possible to obtain a single seamless picture.

Figure 5:
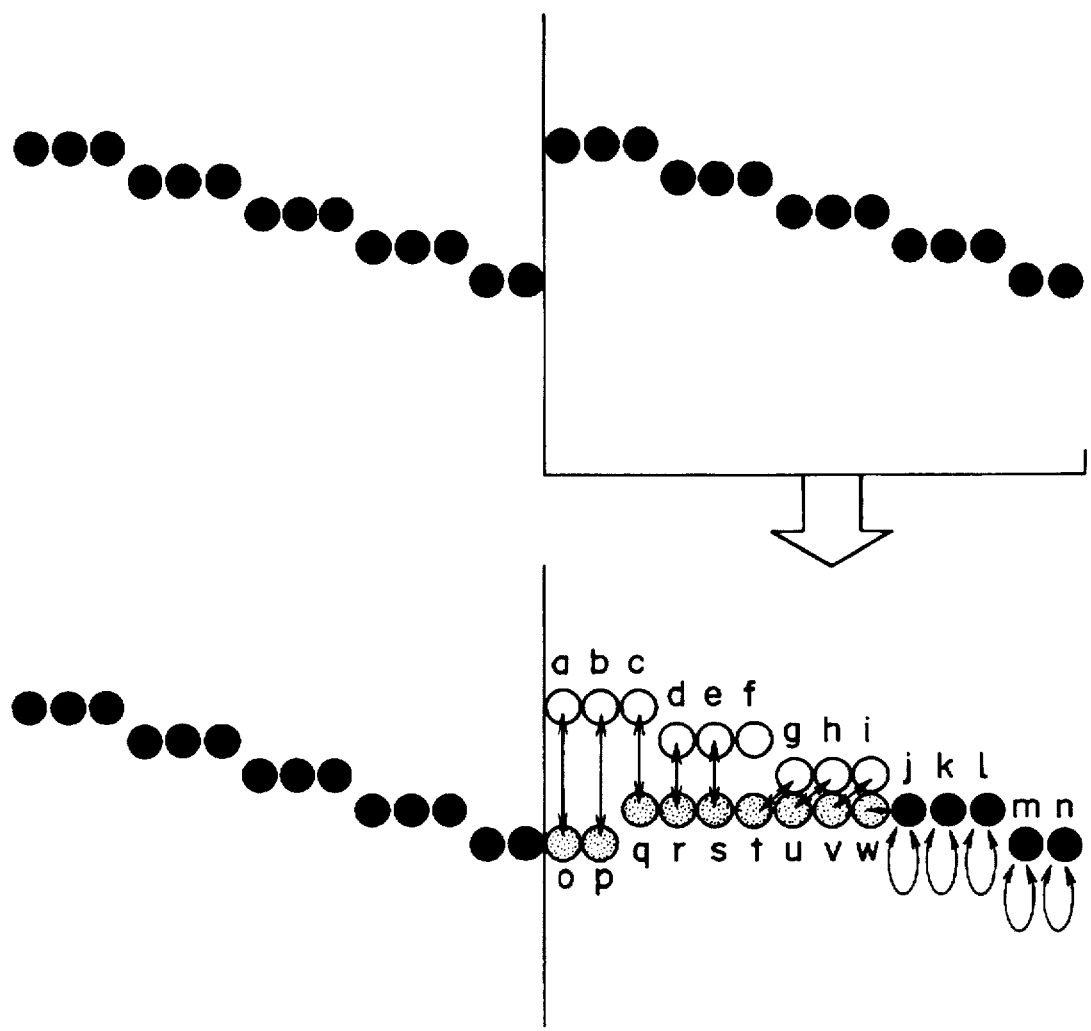
FIG. 5 is an explanatory diagram relating to finding the positions of picture elements in the pre-compensation picture corresponding to picture elements in the post-compensation picture.

FIG. 5 is an explanatory diagram for a case in which the positions of picture elements in the pre-compensation picture corresponding to each picture element in the post-compensation picture are found, and this FIG. 5 is enlarged such that the correspondence of picture elements in the compensation pictures is clear. In FIG. 5, each circle indicates a single picture element. Further, the top of FIG. 5 shows the state prior to compensation and the bottom shows the state after compensation. Further, the right side of FIG. 5 is the picture which is the subject of the compensation, and it is assumed that it has been specified that picture element a is to correspond with picture element o, as a compensating vector.

When the present invention is applied, the result is that the black picture elements a to n move to o to w and j, k, l, m and n.

This is achieved by calculating to which picture elements on the original image the picture elements o to w and j to n correspond, using the calculating formula described above.

FIG. 6 is a figure showing how the original picture elements and the post-compensation picture elements correspond, and it shows that, for example, picture element p corresponds with picture element b, and that the original picture element value of the picture element b becomes the picture element value of the picture element p after compensation. Further, it indicates that there is no corresponding picture element after compensation for the original picture element f, and that two picture elements w and j correspond with the original picture element j.

A description will now be given relating to an embodiment in which a single seamless picture is obtained at high speed.

If it is desired to obtain a single seamless picture at high speed, then it is desirable to batch-process portions which are considered to have a uniform mobility vector (movement vector), without processing all of the picture elements in the picture (image) individually.

Thus, in a second embodiment of the present invention, a plurality of groups of points which are to be connected are specified on adjacent pictures which have been read by the image scanner 10, after which the picture which is to be subjected to compensation is divided into a plurality of square blocks in which the number of picture elements in one side is a power of two.

The position of the pre-compensation picture element corresponding to the position of the post-compensation picture element is found for the vertices of each block using the method described in the abovementioned first embodiment.

In other words, the positions of pre-compensation picture elements corresponding to the positions of the post-compensation picture elements of the vertices is found by executing the calculations in accordance with the abovementioned formula (1) and formula (2). The amount of movement of each vertex is thus determined. In the specification hereinbelow, the amount of movement of each vertex obtained by executing the calculations in accordance with the abovementioned formula (1) and formula (2) is defined as the mobility vector.

The mean vector of the mobility vectors for each vertex is then found, after which variate vectors (difference vectors) between the mobility vectors for each vertex and the above mentioned mean vector are found.

Then, if the maximum value of the four variate vectors is less than a predetermined threshold value, then said mean vector is determined to be the mobility vector for all of the picture elements in the corresponding block, and the value of each picture element in the block is set to the values of the corresponding picture elements using the above mentioned mean vector.

If the maximum value of the above mentioned variate vectors is larger than the predetermined threshold value then the corresponding block is divided into four equal parts, and the mobility vectors of the vertices of each sub-block are found, and the mean vector of these mobility vectors is found, after which variate vectors between the mobility vectors for each vertex and the mean vector are found.

This process is repeated until the number of picture elements in one side of the sub-block is two picture elements, or until the maximum value of the variate vector is less than the threshold value.

Figure 7:
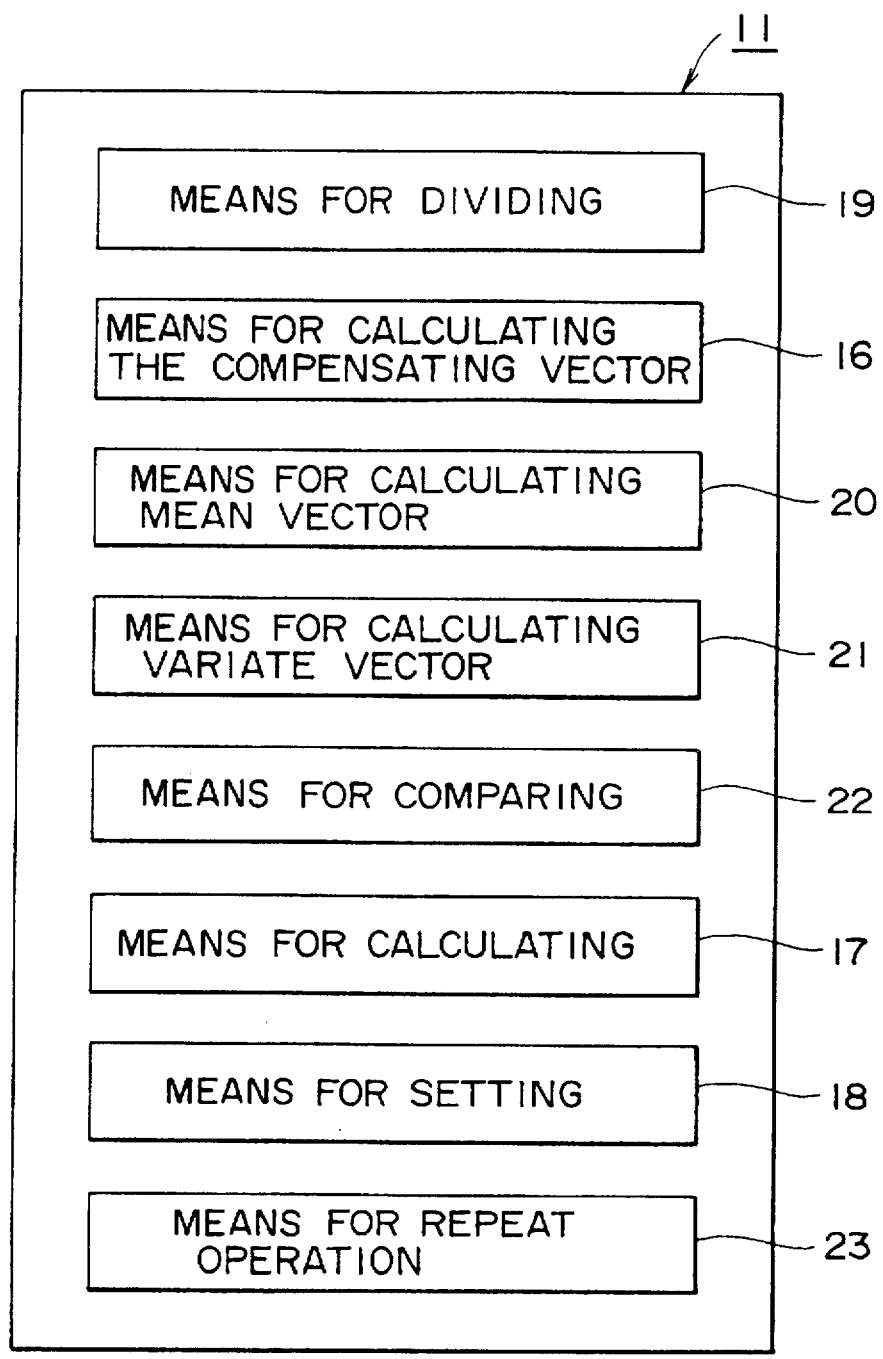
FIG. 7 is a detailed schematic diagram of a central processing unit intended to achieve image compounding at high speed.

FIG. 7 is a block schematic diagram showing the detailed construction of a central processing unit 11 in a device which performs a high-speed image compounding process, and this central processing unit 11 is provided with a means for dividing (division means) 19 which divides the picture which is to be subjected to compensation into a plurality of square blocks in which the number of picture elements in one side is a power of two; a means for calculating the mobility vector (mobility vector calculating means) 16 which finds the mobility vectors for the vertices of each divided block; a means for calculating mean vector (mean vector calculating means) 20 which finds the mean vector of the calculated mobility vectors; a means for calculating variate vector (variate vector calculating means) 21 which finds the variate vectors between the mobility vectors and the mean vector; a means for comparing (comparison means) 22 which compares whether or not the maximum value of the above mentioned variate vectors is less than a predetermined threshold value; a means for calculating (calculating means) 17 which, if, based on the comparison result from the comparison means 22, the maximum value of the above mentioned variate vectors is less than the predetermined threshold value, determines that said mean vector is the mobility vector for all of the picture elements in the corresponding block, and finds the positions of picture elements in the pre-compensation picture corresponding to the picture elements in the post-compensation picture for the corresponding block; a means for repeat operation (repeat operation means) 23 which, if, based on the comparison result from the above mentioned comparison means 22, the maximum value of the above mentioned variate vectors is more than the predetermined threshold value, divides the corresponding block further into four equal parts, finds the mobility vectors for the vertices of each sub-block, and in the above mentioned calculating means 17 finds the positions of picture elements in the pre-compensation picture corresponding to the picture elements in the post-compensation picture in the corresponding sub-block, and repeatedly executes this process until the number of picture elements in one side of a sub-block is two picture elements, or until the maximum value of the variate vectors is less than the threshold value; and a means for setting (setting means) 18 which is the same as in FIG. 2.

A description will now be given of the high-speed image compounding process using the flowcharts in FIG. 8 and FIG. 9.

Firstly, two maps (map A 31 and map B 32) which have been input from the image scanner 10 are displayed on the graphic display 13 as shown in the upper diagram in FIG. 3 (step 501).

In the present embodiment, map B 32 is the object of the compensation. The compensated result is as shown in the lower diagram. End points (o symbol) which are the object of the compensation (compensation origin points) and their compensation destination points (x symbol) are then specified using the mouse 15. Compensating vectors which make the compensation origin points coincide with the compensation destination points are then found using the coordinate values of the compensation origin points and compensation destination points (step 502).

The post-compensation picture is then divided into square blocks B1 to Bj in which the sides have "$2^n \times 2^m$" (n is an integer, $\geq 1$) picture elements, as shown in FIG. 10 (step 503).

The foremost block B1 from the block B1 to Bj is then taken as the noticeable block (block under consideration) (step 504). The corresponding picture elements are then found for the picture elements within the noticeable block (step 505).

It is then determined whether or not the specified, noticeable block is the last block (step 506) and if it is not the last block then the next noticeable block is specified (step 507), and if in step 506 the noticeable block is the last block then the precess ends.

A description will now be given of the high-speed processing for a block unit found in step 503. Processing of this block will be described using FIG. 9.

Mobility vectors which indicate the amount of movement of the picture elements corresponding to the four vertices P1 to P4 of the block which is the result of division in step 503 in FIG. 8 are found (step 601).

If the block size is "2×2" picture elements (step 602) then the resulting vectors becomes the mobility vectors without further modification (step 606).

When this is not the case, firstly mean vector of the mobility vectors of the four vertices P1 to P4 is found (step 603). The variate vectors between the mean vector and the mobility vectors for the four vertices are then found, it is determined whether or not the maximum value thereof is less than "1" (threshold value) (step 604), and if the maximum value thereof is less than "1" (threshold value), then the mean vector is adopted as the mobility vector corresponding to all of the picture elements within the block (step 605).

If the maximum value of the variate vectors is "1" or more, then the current block is further divided into four by bisecting each side (step 607). Block B3 in FIG. 10, for example, is further divided into four blocks, b1, b2, b3 and b4. The process from step 504 in FIG. 8 is then recursively called and executed for the upper left block b1, and the same process is repeated in the upper left block b1 until the number of picture elements in one side is two picture elements or until the maximum value of the variate vectors is less than "1" (step 608).

In this case, if the maximum value of the variate vectors in block b3 is "1" or more then it is further divided into b31, b32, b33 and b34, and the same process is repeated.

The process is performed similarly for the upper right block b2, the lower right block b3 and the lower left block b4 (step 609, 610 and 611).

Figure 4:
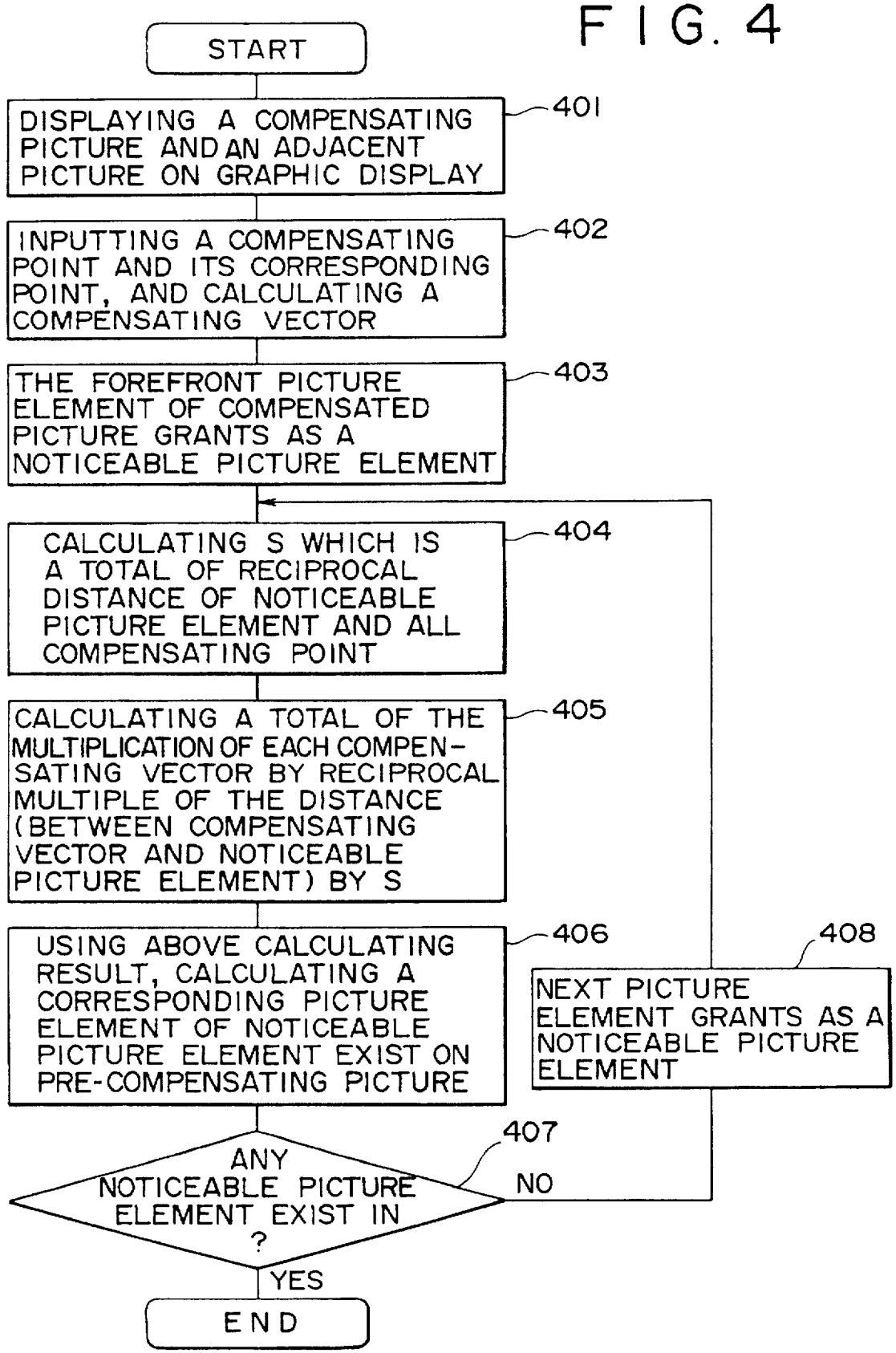
FIG. 4 is a flowchart showing the method for forming compound images of the present invention.

It should be noted that the detailed processes in step 505 in FIG. 8 and steps 605 and 606 in FIG. 9 are the same as the processes from step 404 to step 406 in FIG. 4.

Thus, when finding the movement positions of picture elements, the picture which is to be subjected to compensation is divided into a plurality of square blocks, and when the differences between the mobility vectors of the vertices of each block and the mean vector is small, the picture elements within the block are batch-processed according to the mean vector, and therefore cases in which blocks are batch-processed according to the mean vector increase with distance from the seam of the pictures, and it is possible to obtain a single seamless picture at extremely high speed in comparison with cases in which compensation is performed in single picture element units.

In the present invention as described hereinabove, an arbitrary number of corresponding points are specified in the vicinity of the boundary of a plurality of adjacent map images, and calculations are performed to determine how other picture elements should move, based on these specified points, and it is thus possible to connect a plurality of adjacent map images accurately without performing positional displacement at the connecting boundaries, and it is possible to obtain a single seamless image.

Further, when finding the movement positions of the picture elements the image which is to be subjected to compensation is divided into a plurality of square blocks, and when the difference between the compensating vectors of the vertices of each block and the mean vector is small, the picture elements within the block are batch-processed according to the mean vector, and it is therefore possible to obtain a single seamless image at high speed.

What is claimed is:

1. An image compounding method in which images on a plurality of adjacent maps are read in by an image input means and said adjacent maps are compounded and displayed on a computer, the method comprising the steps of:

specifying an arbitrary number of corresponding points to be connected on said adjacent maps; defining points on a map to be subjected to compensation as compensation original points, and points on another map as compensation destination points, and calculating compensating vectors which make the compensation original points coincide with the compensation destination points;

calculating positions of picture elements on a pre-compensation image corresponding to picture elements on a post-compensation image by multiplying compensating vectors by coefficients which are inversely proportional to the distance from the compensation destination points to the picture elements on the post-compensation image, and the sum of which is "1", and setting the values of the resulting picture element positions as the values of the picture elements corresponding to the post-compensation image;

dividing the image to be subjected to compensation into a plurality of square blocks in which the number of picture elements in one side is a power of 2;

calculating mobility vectors for each vertex of each block using the difference of position of picture elements between pre-compensation and post-compensation, which is calculated at the defining step and the calculating positions step;

calculating the mean vector of the mobility vectors, and for calculating variate vectors between the mobility vectors of each block and the mean vector;

comparing the variate vectors of each of the vertices with a predetermined threshold value;

deciding the mean vector as the mobility vector for all of the picture elements in the corresponding block, when the maximum value amongst the variate vectors of each of the vertices is smaller than the threshold value; and dividing the corresponding block into four equal parts, and for repeating the dividing step to the deciding step recursively for each sub-block until a number of picture elements in one side of a sub-block is two picture elements or until the maximum value of the variate vectors is less than the threshold value, when the maximum value amongst the variate vectors for each of the vertices is larger than the threshold value.

2. An image compounding device having image input means for reading in images on a plurality of adjacent maps and compounding and displaying means for compounding and displaying said adjacent maps on a computer, comprising:

specifying means for specifying an arbitrary number of corresponding points to be connected on said adjacent maps;

compensating vector calculating means for defining points on a map to be subjected to compensation as compensation original points, and points on another map as compensation destination points, and calculating compensating vectors which make the compensation original points coincide with the compensation destination points;

position calculating means for calculating positions of picture elements on a pre-compensation image corresponding to picture elements on a post-compensation image by multiplying compensating vectors by coefficients which are inversely proportional to a distance from the compensation destination points to the picture elements on the post-compensation image, and the sum of which is "1";

setting means for setting the values of resulting picture element positions as the values of the picture elements corresponding to the post-compensation image;

dividing means for dividing the image to be subjected to compensation into a plurality of square blocks in which the number of picture elements in one side is a power of 2;

mobility vector calculating means for calculating mobility vectors for each vertex of each block using the difference of position of picture elements between pre-compensation and post-compensation, which is respectively calculated by the compensating vector calculating means, position calculating means, and setting means;

variate vector calculating means for calculating the mean vector of the mobility vectors, and for calculating variate vectors between the mobility vectors of each block and the mean vector;

comparing means for comparing the variate vectors of each of the vertices with a predetermined threshold value;

deciding means for deciding the mean vector as the mobility vector for all of the picture elements in the corresponding block, when the maximum value amongst the variate vectors of each of the vertices is smaller than the threshold value; and controlling means for dividing the corresponding block into four equal parts, and for repeating the control of compensating vector calculating means, variate vector calculating means, comparing means, and deciding means recursively for each sub-block until a number of picture elements in one side of a sub-block is two picture elements or until the maximum value of the variate vectors is less than the threshold value, when the maximum value amongst the variate vectors for each of the vertices is larger than the threshold value.

* * * * *